United States Patent
Flatley et al.

(10) Patent No.: US 9,453,537 B2
(45) Date of Patent: Sep. 27, 2016

(54) COUPLER ASSEMBLY

(71) Applicant: DEERE & COMPANY, Moline, IL (US)

(72) Inventors: Zachary T. Flatley, Cuba City, WI (US); Nathan J. Horstman, Durango, IA (US); Brian J. Althoff, Dubuque, IA (US); James Luong, Aylmer (CA); Stephan E. Bohner, Woodstock (CA)

(73) Assignee: DEERE & COMPANY, Moline, IL (US)

( * ) Notice: Subject to any disclaimer, the term of this patent is extended or adjusted under 35 U.S.C. 154(b) by 524 days.

(21) Appl. No.: 14/068,423

(22) Filed: Oct. 31, 2013

(65) Prior Publication Data

US 2015/0117938 A1    Apr. 30, 2015

(51) Int. Cl.
*F16D 1/108*  (2006.01)
*F16D 1/06*   (2006.01)

(52) U.S. Cl.
CPC .................. *F16D 1/108* (2013.01); *F16D 1/06* (2013.01); *Y10T 403/55* (2015.01)

(58) Field of Classification Search
CPC ............. Y10T 403/55; Y10T 403/557; Y10T 403/559; Y10T 403/5761; Y10T 403/7018–403/7024; F16D 1/04; F16D 1/05; F16D 1/08; F16D 1/0876; F16D 1/0882; F16D 1/108; F16D 1/00; B60G 17/019; B60G 17/01933

See application file for complete search history.

(56) References Cited

U.S. PATENT DOCUMENTS

| | | | | |
|---|---|---|---|---|
| 4,135,838 A * | 1/1979 | Vandenberg | ............ | F16K 31/54 137/315.35 |
| 4,551,118 A * | 11/1985 | Spisz | ........................ | F16C 1/04 403/298 |
| 6,261,182 B1 * | 7/2001 | Chino | ........................ | F16D 1/06 403/306 |
| 6,293,022 B1 * | 9/2001 | Chino | .................. | B62D 15/023 33/1 PT |
| 6,951,145 B2 * | 10/2005 | Kilmartin | ............ | B60G 17/019 73/862.333 |

OTHER PUBLICATIONS

Deere & Company, Color images of prior production parts, date unknown (known to applicant before the invention of the subject matter of this application), 3 pages.
Deere & Company, "Adapter, circle center", 2008 (known to applicant before the invention of the subject matter of this application), 1 page.

* cited by examiner

*Primary Examiner* — Daniel Wiley

(57) ABSTRACT

A coupler pin couples an output sleeve of rotary unit to an input member of a rotary sensor with interference fits. The coupler pin has a first part and a second part. A key groove is formed in an inner surface of a coupling bore in the output sleeve. The first part is received by the coupling bore, and the first part has a key member which is received by the key groove. The second part has a key slot formed therein. The input member has a key. The key has a slip fit with a first part of the key slot and has an interference fit with a second part of the key slot. The key projects inwardly from a wall of a coupling bore in the input member. The second part is divided into a plurality of sections by axially extending cross-cuts.

5 Claims, 7 Drawing Sheets

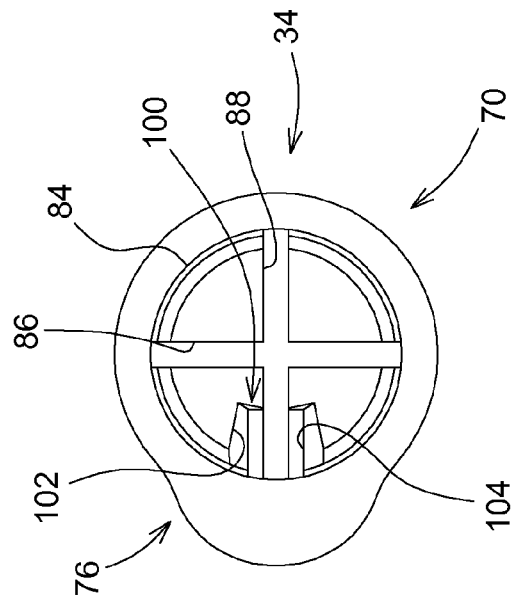
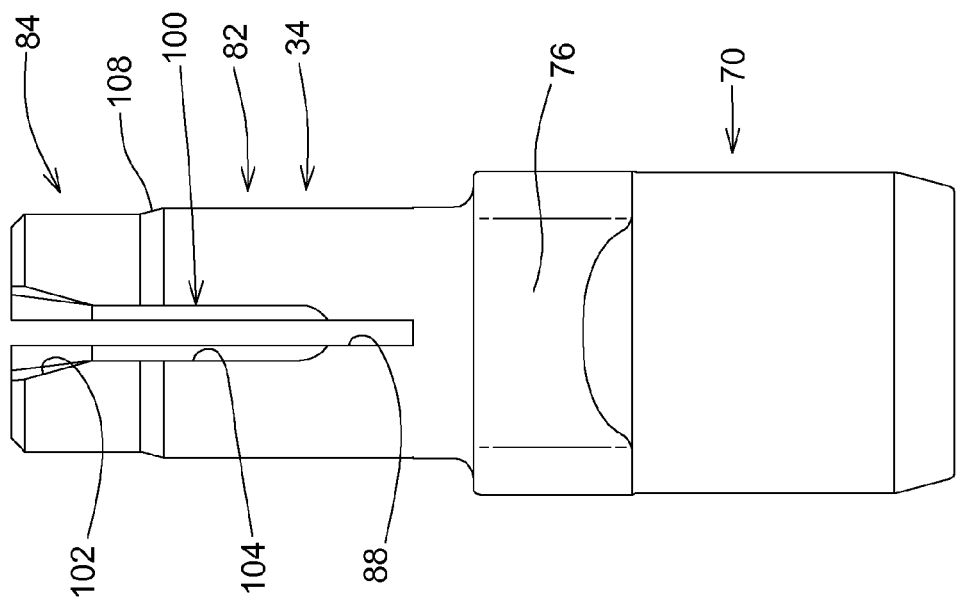
FIG. 7
FIG. 6

COUPLER ASSEMBLY

FIELD

The present disclosure relates to a coupler assembly for a rotary unit coupled to a sensor.

BACKGROUND

To sense the rotary or angular position of a rotating mechanical part, it is necessary to couple the rotating part to a rotary sensor. For example, a grader type work vehicle includes front and rear wheels which support a generally longitudinal frame. The frame member provides support for a rotatable working blade. A rotary motor controls the rotary position of the blade. An electrical sensor senses the rotary position or angle of the blade. Any mechanical hysteresis between the rotating blade and the sensor will have a negative effect on the accuracy of the blade rotation system. In such a configuration, it is desirable to use a coupler that does not allow this type of hysteresis.

SUMMARY

According to an aspect of the present disclosure, a coupler assembly is coupled to a rotary sensor. The sensor has an input member, and the rotary unit includes an output sleeve with a coupling bore formed therein. A coupler pin has a first part and a second part. The first part is coupled to the rotary unit with an interference fit, and the second part is coupled to the input member with an interference fit. A key groove is formed in an inner surface of the output sleeve. The first part of the coupler pin is received by the coupling bore, and the first part of the coupler pin has a key member which is received by the key groove.

The second part has a cylindrical body having a larger diameter base and a smaller diameter tip projecting from the base. The second part has a key slot formed therein. The tip has a slip fit with the input member and the base has an interference fit with the input member. The input member has a key. The key has a slip fit with the key slot in the tip and has an interference fit with the key slot in the base. The input member has a coupling bore formed therein and the key projects inwardly from a wall of the coupling bore.

The tip and the base are divided into a plurality of sections by axially extending cross-cuts. The key slot intersects with one of the cross-cuts. The sections are movable radially inwardly and outwardly towards and away from each other.

BRIEF DESCRIPTION OF THE DRAWINGS

FIG. 6 is a side view of the coupler pin of FIG. 5;

FIG. 7 is an end view of the coupler pin of FIG. 5;

DETAILED DESCRIPTION OF THE DRAWINGS

Figure 1:
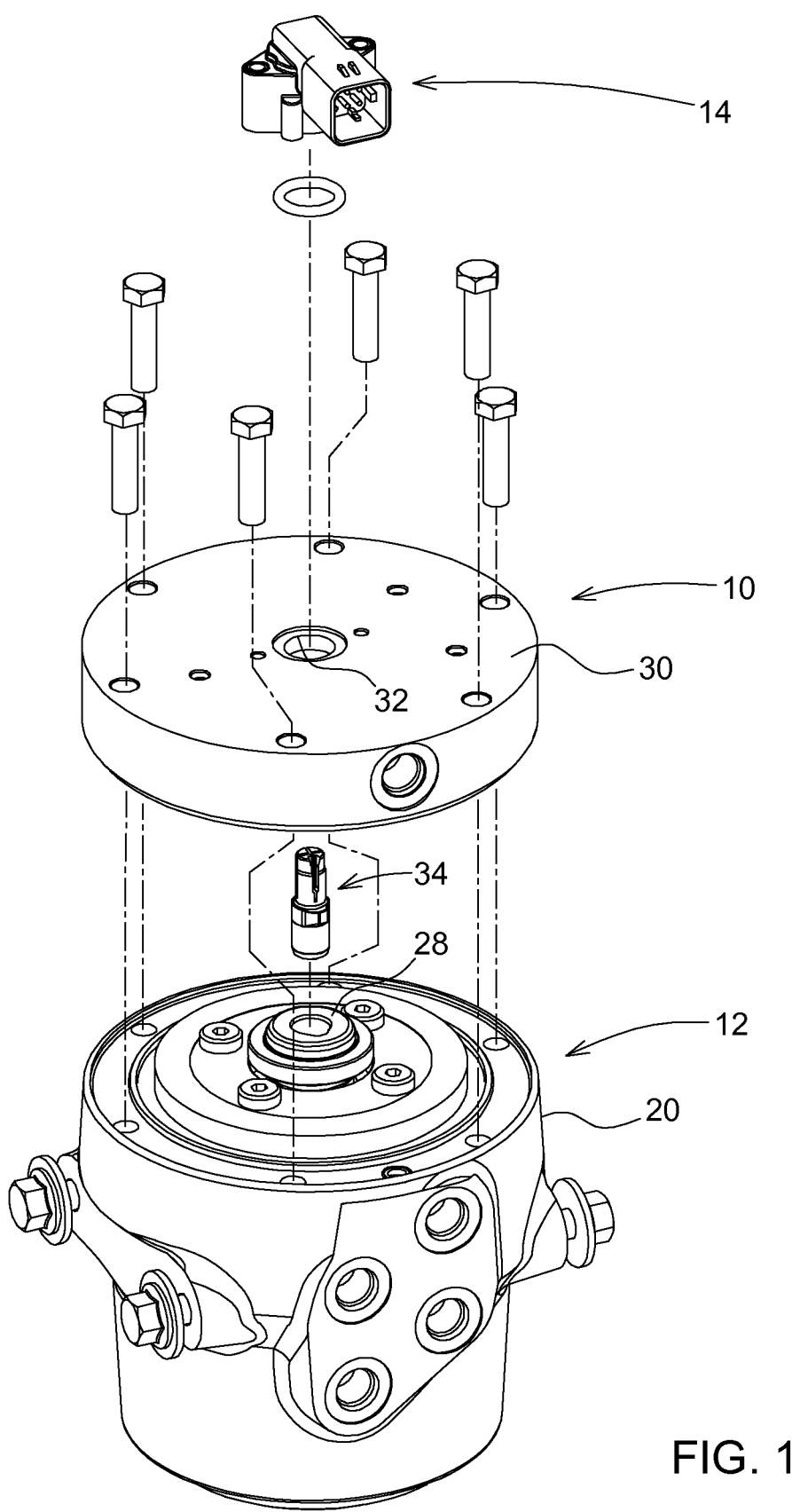
FIG. 1 is an exploded perspective view of a coupler assembly embodying the invention.
Figure 2:
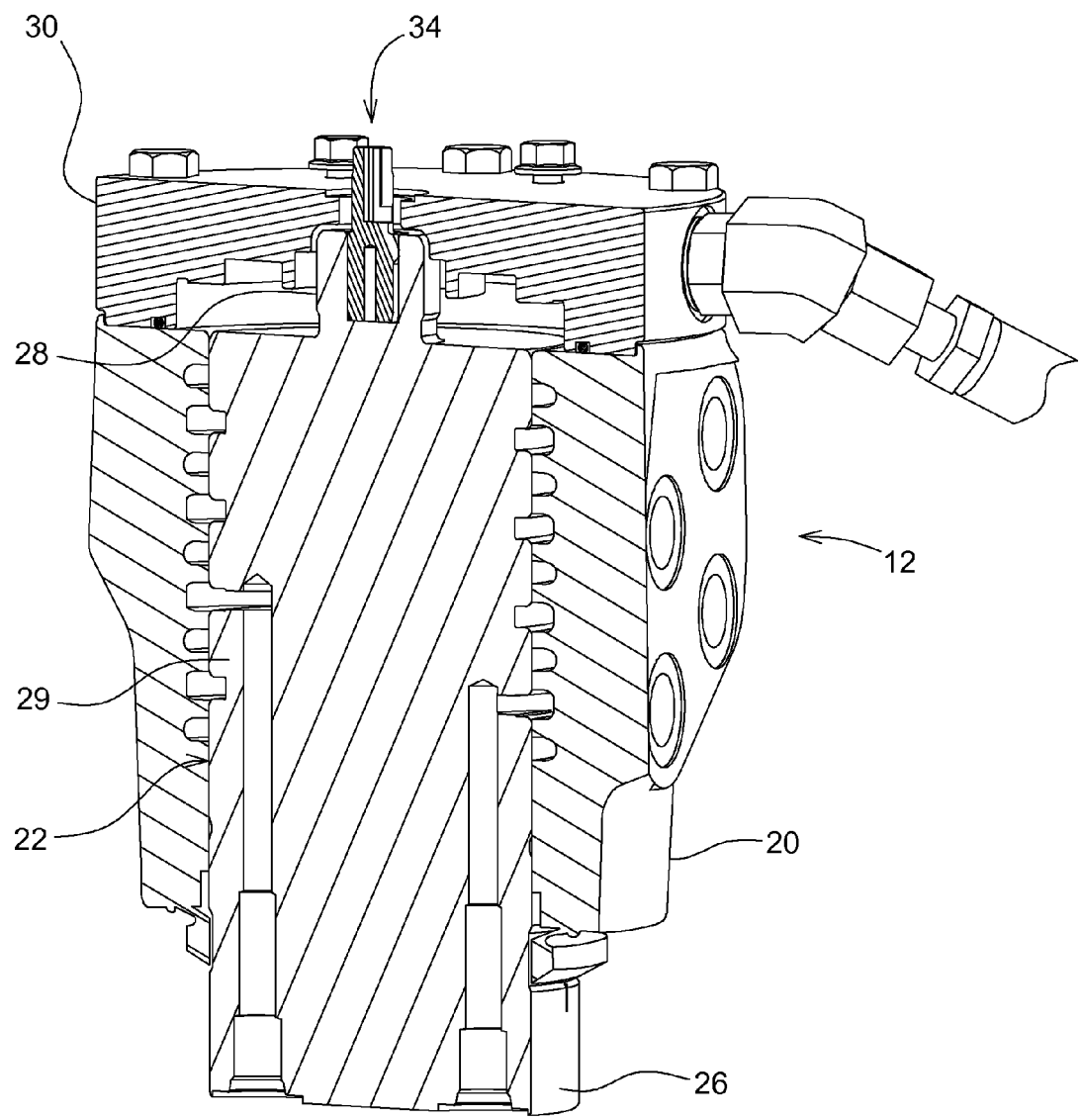
FIG. 2 is a partially sectioned view of the assembly of FIG. 1.
Figure 3:
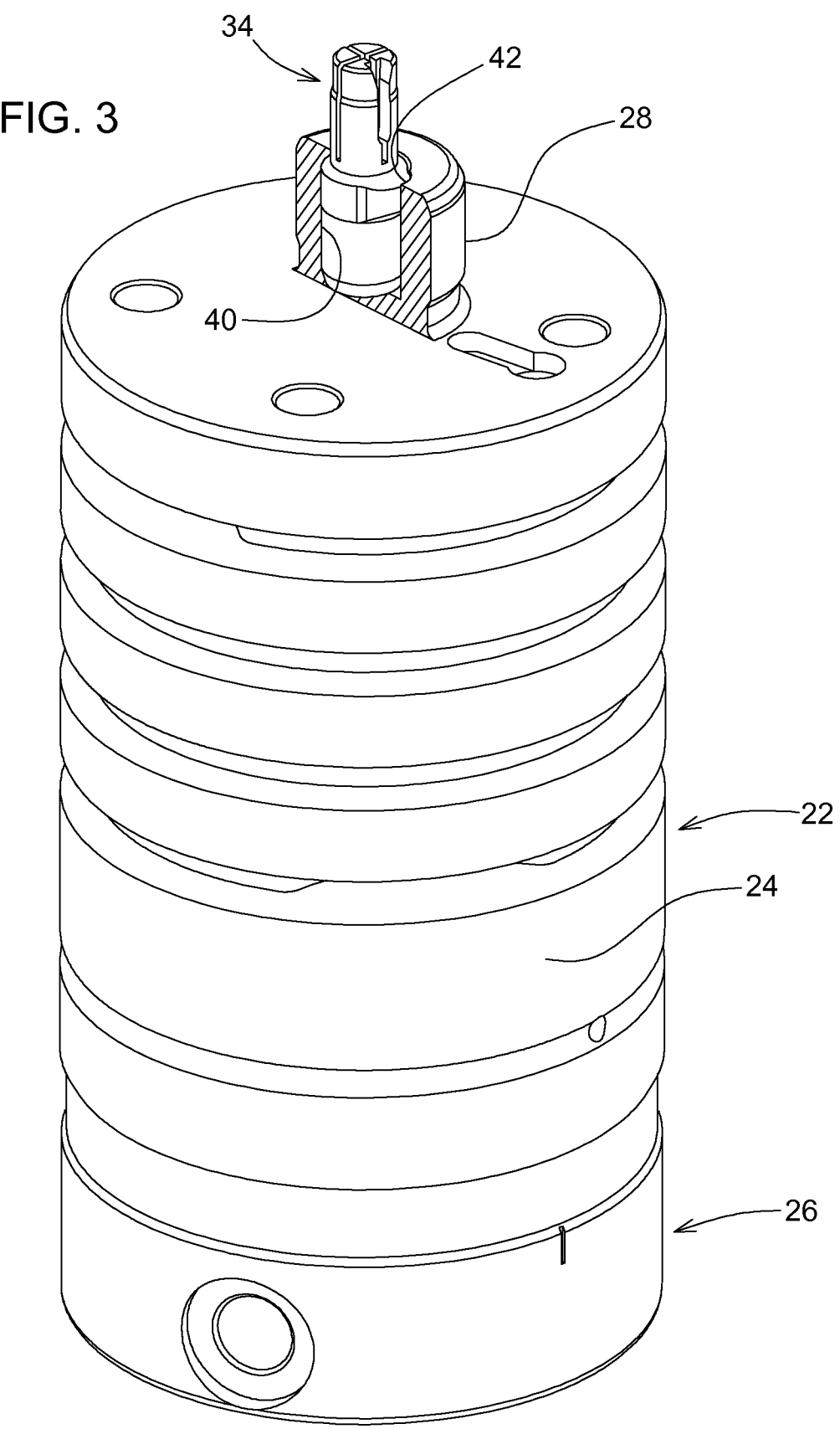
FIG. 3 is a partially sectioned view of a portion of the assembly of FIG. 2.

Referring to FIGS. 1-3, a coupler assembly 10 couples a rotary hydraulic motor or unit 12 to a rotary sensor 14. The motor 12 includes a housing 20 and a manifold spool 22 which rotates in the housing 20. The manifold spool includes a main body 24, a lower outer end 26 which is coupled to a grader blade (not shown), and a hollow coupler or output sleeve 28 which extends axially from the upper end of the main body 24. A manifold cover 30 is fixed to the housing 20 and has a central opening 32 which receives the sleeve 28.

Figure 4:
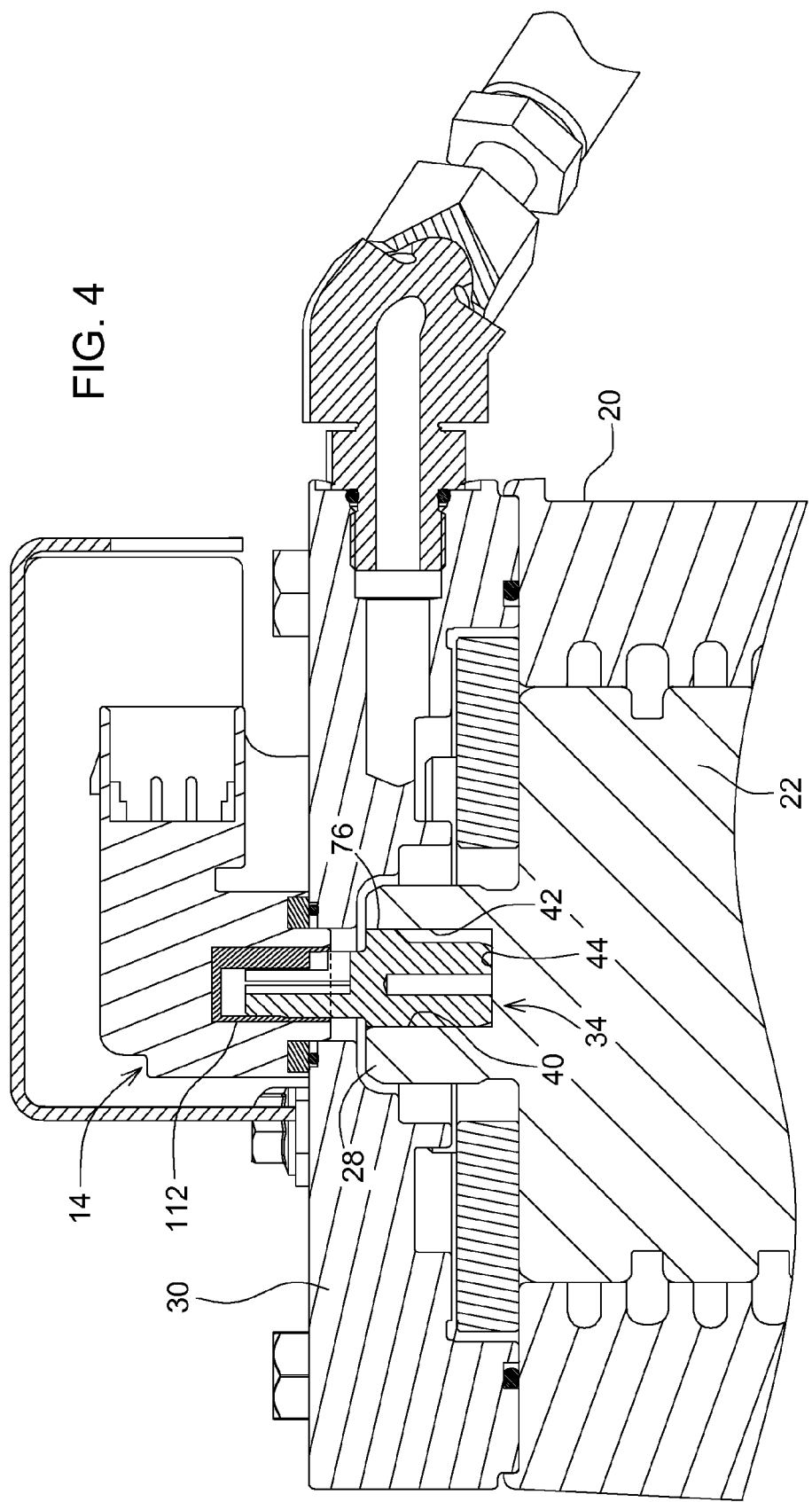
FIG. 4 is a view taken along lines 4-4 of FIG. 1.

A coupler pin 34 couples the sleeve 28 to the sensor 14. As best seen in FIGS. 3 and 4, the sleeve 28 includes a uniform diameter cylindrical sleeve bore 40. A key grove 42 extends axially along one side of the bore 40. The bore 40 terminates at bottom wall 44, and preferably tapers from a slightly wider outer and to a narrower inner end.

Figure 5:
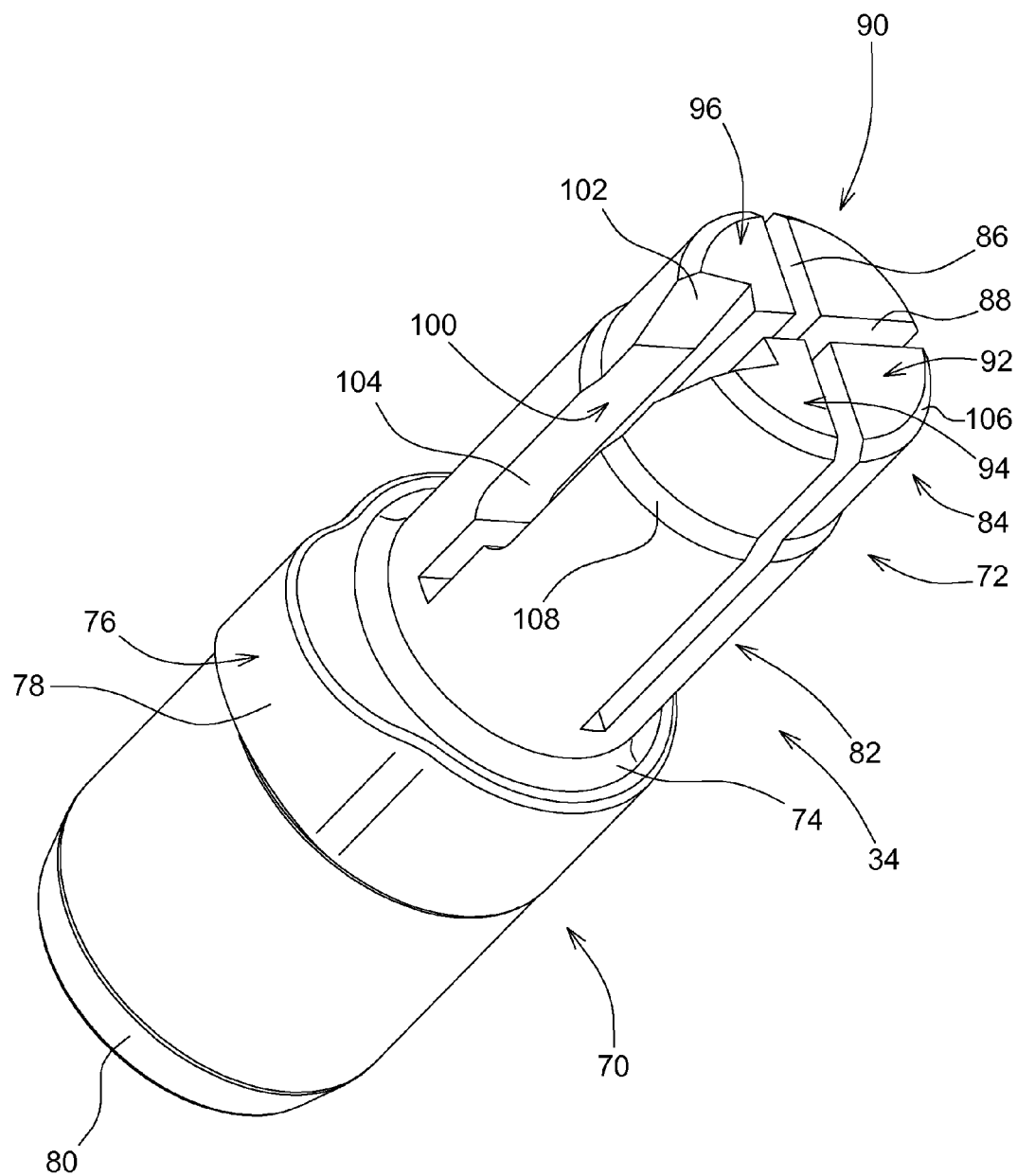
FIG. 5 is a perspective view of the coupler pin of FIG. 1.

Referring to FIGS. 5-7, the coupler pin 34 includes a larger diameter first portion 70 and a smaller diameter second portion 72 which projects axially from an end of the first portion 70 and which forms an annular shoulder 74. A key 76 projects radially outwardly from first portion 70 adjacent to the shoulder 74. The key has curved outer surface 78. A chamfer 80 is formed on the end first portion 70. As best seen in FIG. 4, the key 76 is received by the key grove 42. The first portion 70 and the key 76 are received by the bore 40 and the key slot 42 with an interference fit.

The second portion 72 includes a larger diameter base 82 and a smaller diameter tip 84. A pair of cross-cuts or slots 86 and 88 extend axially into the tip 84 and the base 82 of the second portion 72. The slots divide the second portion 72 into four sections 90, 92, 94 and 96. A key slot 100 is formed between sections 94 and 96. Key slot 100 has a larger axially outer end 102 and a smaller axially inner end 104. A chamfer 106 is formed on the outer end of second portion 72 and a chamfer or shoulder 108 is formed between base 82 and tip 84. As best seen in FIG. 7, the inner end 104 of the key slot 104 has a substantially rectangular shape. The slots 86 and 88 permit the sections 90, 92, 94 and 96 to flex radially inwardly and outwardly, and the key slot 100 intersects with the cross-cut 88.

Figure 8:
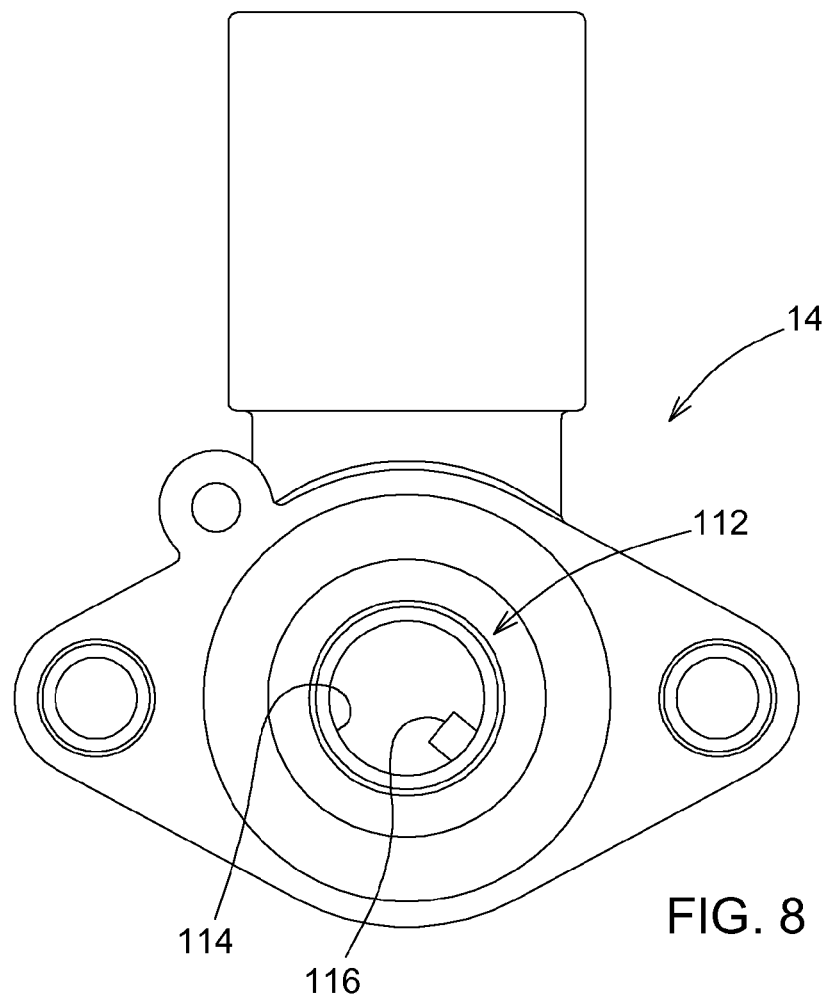
FIG. 8 is an end view of the sensor of FIG. 4.
Figure 9:
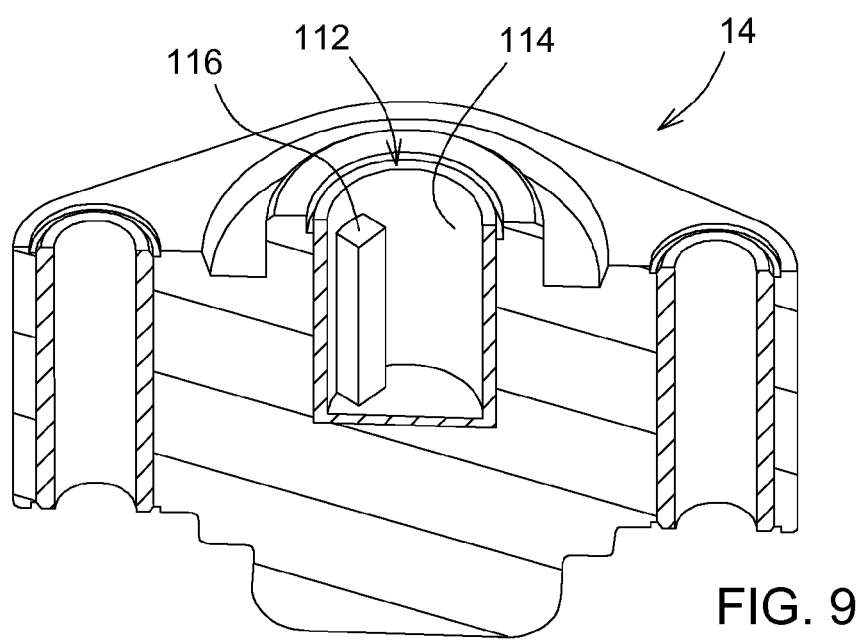
FIG. 9 is a perspective view of the sensor of FIG. 8.

Referring to FIGS. 4, 8 and 9, the sensor 14 has an input sleeve 112 which receives the second portion 72 of the coupler pin 34. The sleeve 112 includes a cylindrical inner wall 114. A key member 116 extends axially along the wall 114. The key member 116 has a cross-sectional shape which is complementary with the shape of the key slot 104, and the key member 116 is slidably received by the key slot 104 so that the input sleeve 112 will rotate with the coupler pin 34. The second portion 72 is received by the sleeve 112 with an interference fit, and the key member 166 is received by key slot 100 with an interference fit. As a result, the motor 12, the coupler pin 34 and the sensor input sleeve 112 will all rotate together without any free-play or hysteresis therebetween.

The result is a coupler assembly which provides an interference fit between a rotating component and a sensor. The coupler is press fit into the rotating component. The sensor installation includes an interference fit keyway as well as a radial interference fit into the sensor. To promote an acceptable level of interference fit, there are two cross cuts down a portion of the coupler to allow the sensor side of the coupler to flex inward, limiting the force exerted on the sensor during installation. The coupler includes a lead in area to allow for installation on the mating component's key prior to the radial interference. The keyway on the coupler also has a chamfered area to promote alignment on the key during installation.

This coupler pin is a single, non-ferrous, piece that does not require extra parts to fasten to either component being coupled. It is also has an interference type fit with both components that it is coupled to. The cross-cuts permit an interference fit while limiting the force required to accomplish a zero mechanical hysteresis coupling.

The non-keyed side of the coupler pin can be any shape that allows no mechanical hysteresis between the coupler pin and the driving rotary unit. The mating component can be any type of part that requires input from the rotary unit. The driving mechanism can be any type of rotating component or rotary actuator.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:

1. A coupler assembly for a rotary unit coupled to a sensor, said coupler assembly comprising:
    a rotary sensor having an input member having a key on an inner portion thereof; and
    a coupler pin having a first part and a second part opposite the first part,
        the first part being coupled to the rotary unit with an interference fit, and
        the second part being coupled to the input member with an interference fit,
    the second part comprising a base and a tip projecting from the base, wherein the tip and base are divided into a plurality of sections by axially extending cross-cuts such that the sections are radially movable, the second part further comprising a key slot through at least part of the tip and the base, wherein the key us received by the key slot.

2. The coupler assembly of claim 1, wherein:
    the rotary unit comprises an output sleeve with a coupling bore formed therein;
    a key groove is formed in an inner surface of the output sleeve; and
    the first part of the coupler pin is received by the coupling bore, and the first part of the coupler pin having a key member which is received by the key groove.

3. The coupler assembly of claim 1, wherein:
    the second part comprises a substantially cylindrical body with the base having a larger diameter base and the tip having a smaller diameter, the tip having a slip fit with the input member and the base having an interference fit with the input member; and
    the key having a slip fit with the key slot in the tip and having an interference fit with the key slot in the base.

4. The coupler assembly of claim 3, wherein:
    the tip and the base are divided into four sections by a pair of axially extending cross-cuts.

5. The coupler assembly of claim 1, wherein: the input member has a coupling bore formed therein and the key projects inwardly from a wall of the coupling bore.

* * * * *